United States Patent
Liu et al.

(10) Patent No.: US 8,275,550 B2
(45) Date of Patent: Sep. 25, 2012

(54) METHOD FOR TARGET-ORIENTED REVERSE TIME MIGRATION FOR PRESTACK DEPTH IMAGING

(75) Inventors: Wei Liu, San Ramon, CA (US); Yue Wang, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 318 days.

(21) Appl. No.: 12/418,343

(22) Filed: Apr. 3, 2009

(65) Prior Publication Data

US 2010/0256916 A1  Oct. 7, 2010

(51) Int. Cl.
*G01V 1/40* (2006.01)
*G01V 1/00* (2006.01)
*G06G 7/48* (2006.01)

(52) U.S. Cl. .............................. 702/11; 367/73; 703/10

(58) Field of Classification Search .................... 702/11, 702/1–2, 5, 12–14, 16–18, 81, 182, 189–191; 703/2, 5, 10; 367/14–15, 21, 24, 37–38, 367/40, 43, 45, 49, 56, 58, 72–73
See application file for complete search history.

(56) References Cited

U.S. PATENT DOCUMENTS 7,376,539 B2 * 5/2008 Lecomte ........................ 703/1

* cited by examiner

*Primary Examiner* — Toan M Le
(74) *Attorney, Agent, or Firm* — Carlos L. Hanze; Marie L. Clapp

(57) ABSTRACT

A method and system for target-oriented reverse time migration for prestack depth imaging. One embodiment of the present invention includes determining an acquisition area within an earth model and also determining a reference surface near a target in the subsurface region of interest. The embodiment includes exciting wavefields from the reference surface and propagating the excited wavefields through the earth model. The embodiment additionally includes recording the wavefields at receiver locations in the acquisition area and at the target and synthesizing wavefields along the reference surface to reconstruct Green's functions which relate the receiver locations in the acquisition area to the target. The embodiment includes utilizing the Green's functions and prestack seismic data to determine subsurface characteristics of the subsurface region.

10 Claims, 13 Drawing Sheets

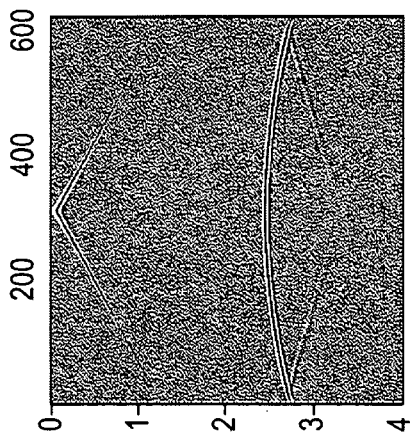
FIG. 4A
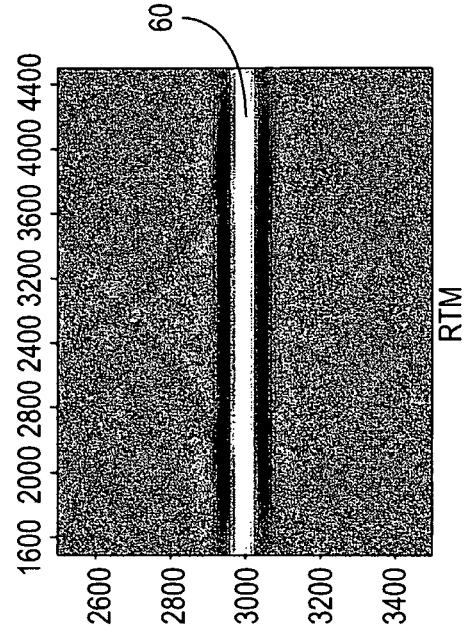
FIG. 4B
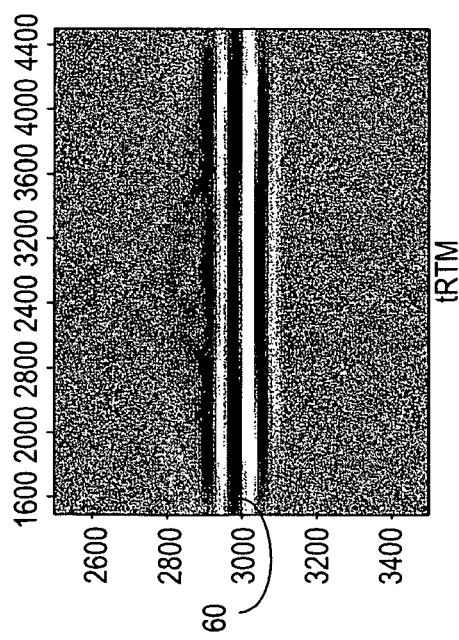
FIG. 4C
FIG. 4D (Prior Art)

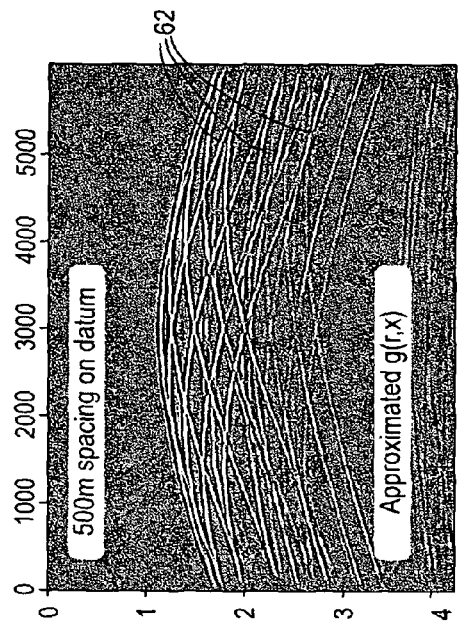
FIG. 5A
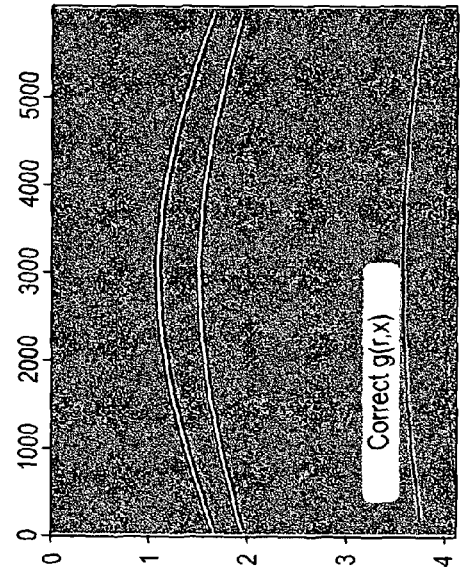
FIG. 5B
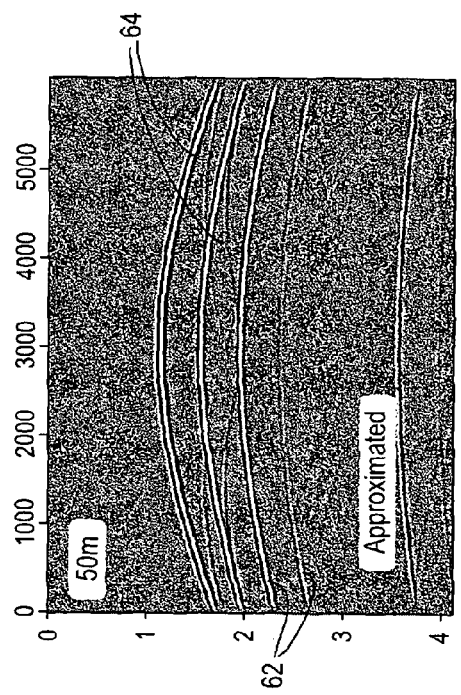
FIG. 5C
FIG. 5D
(Prior Art)

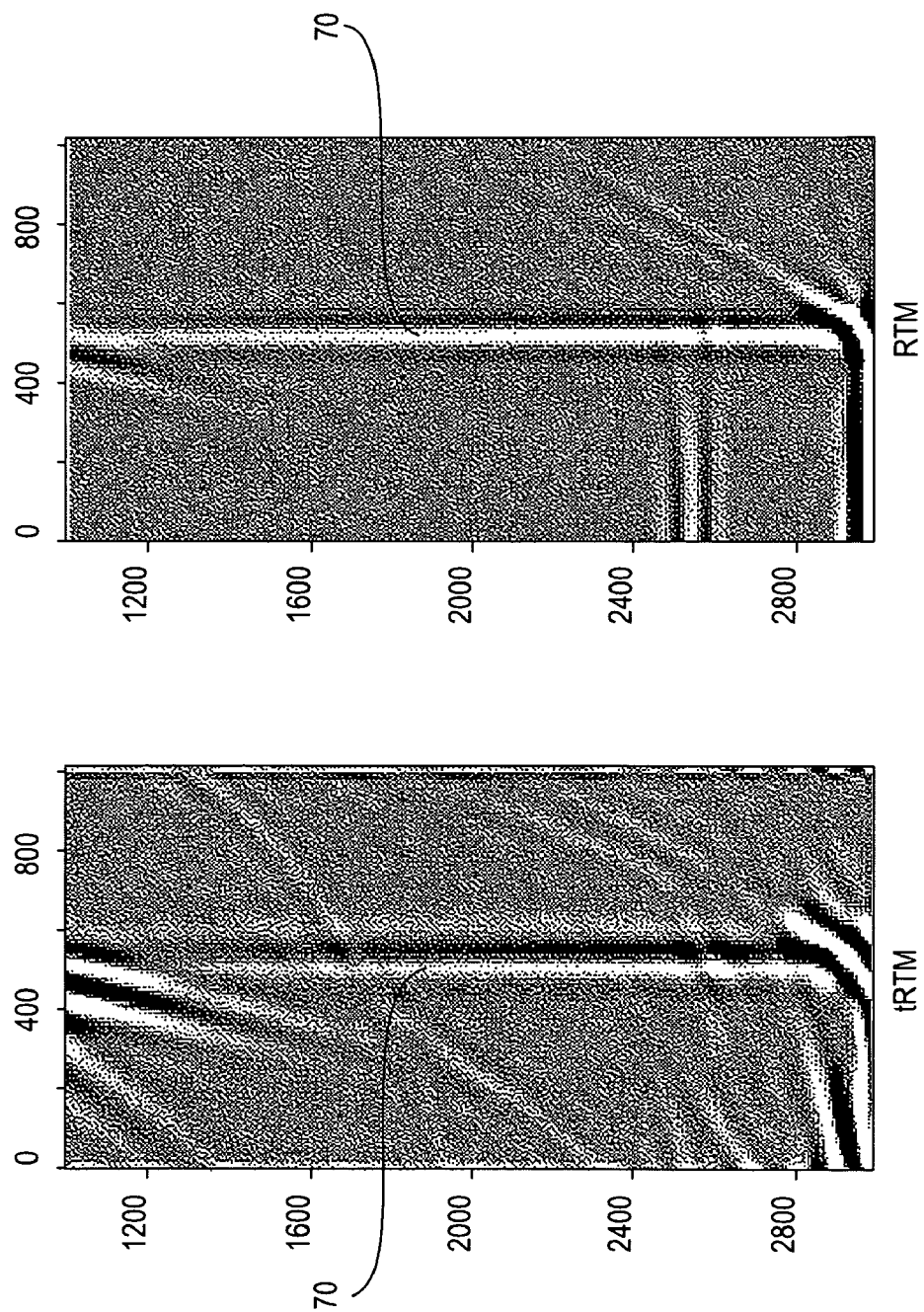

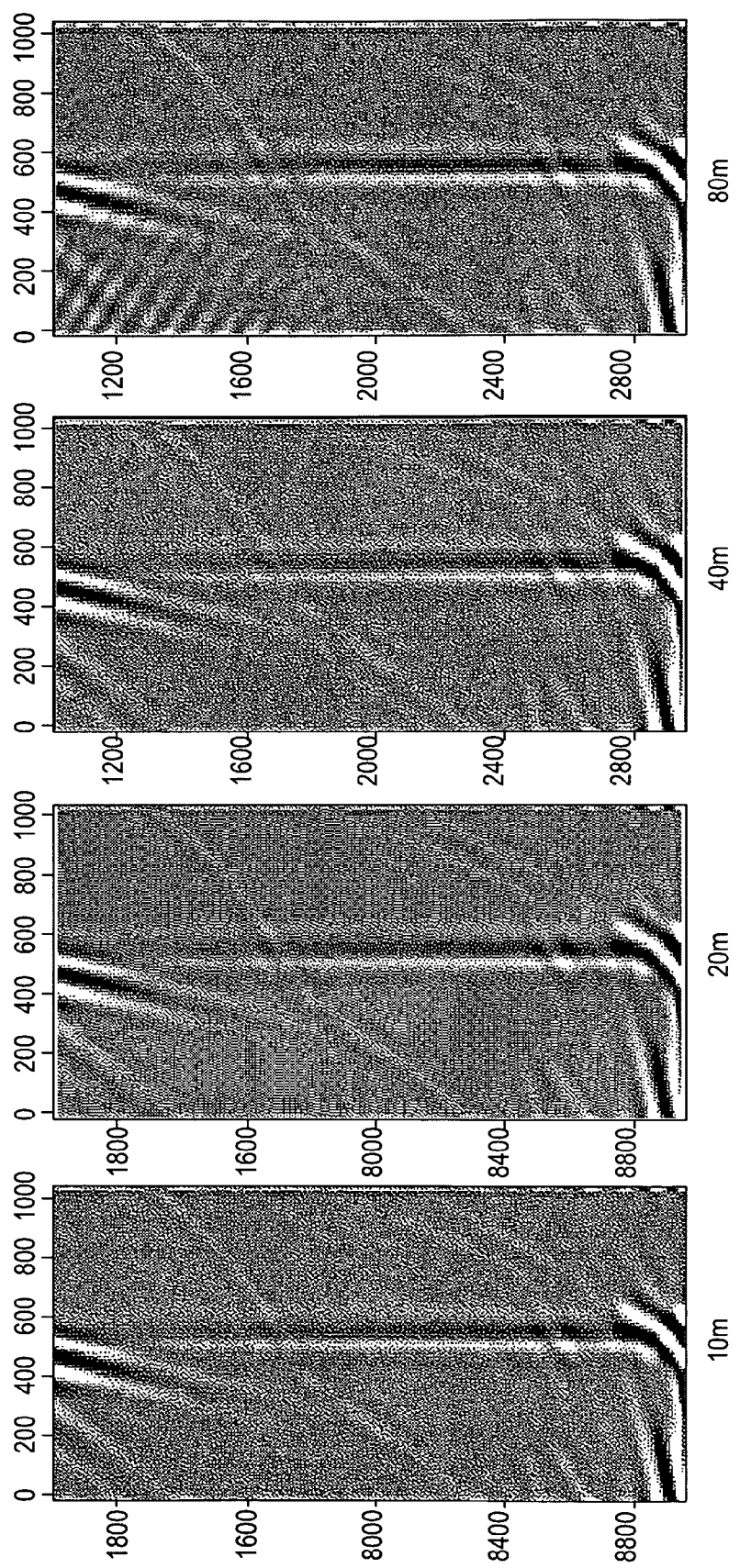

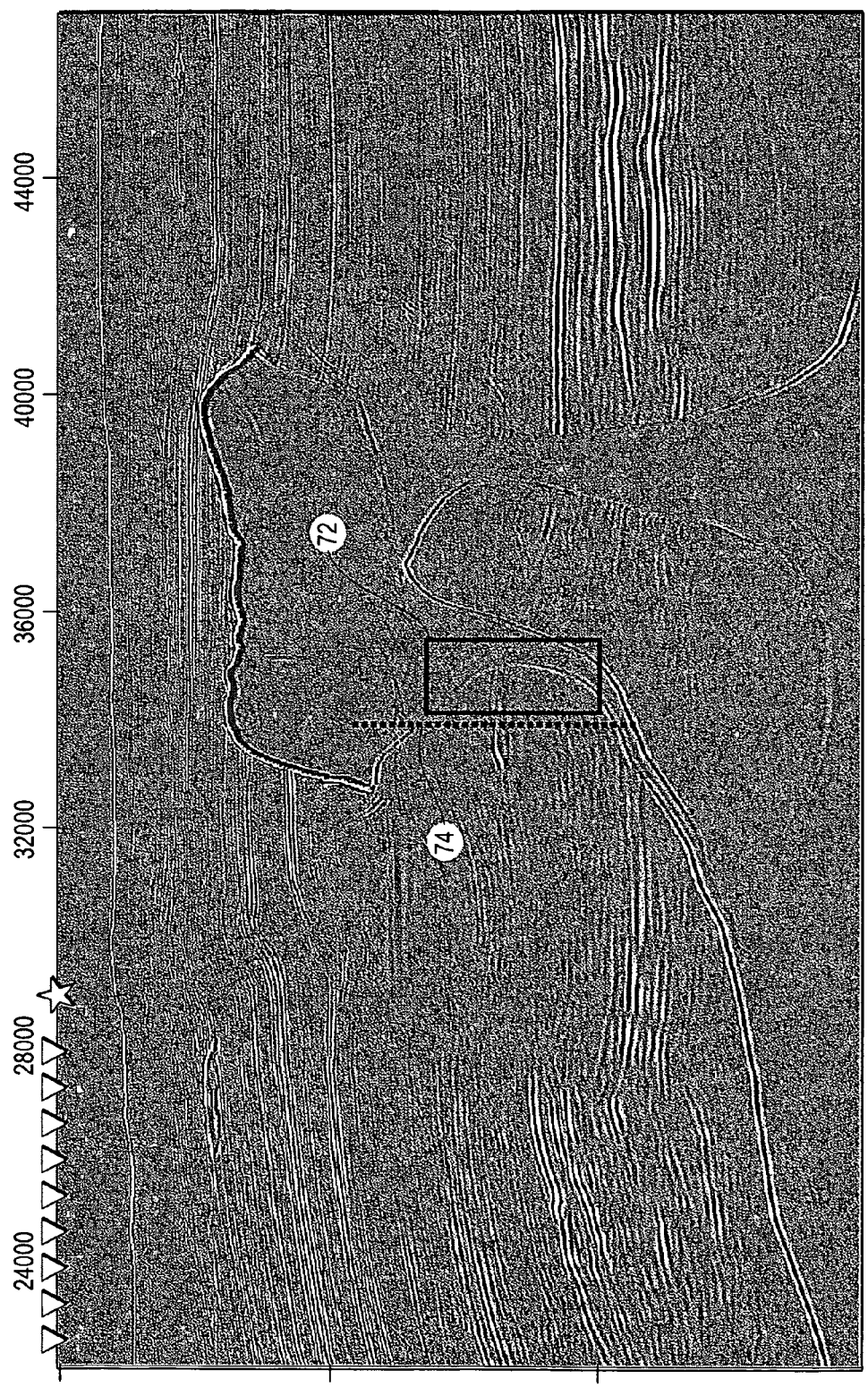

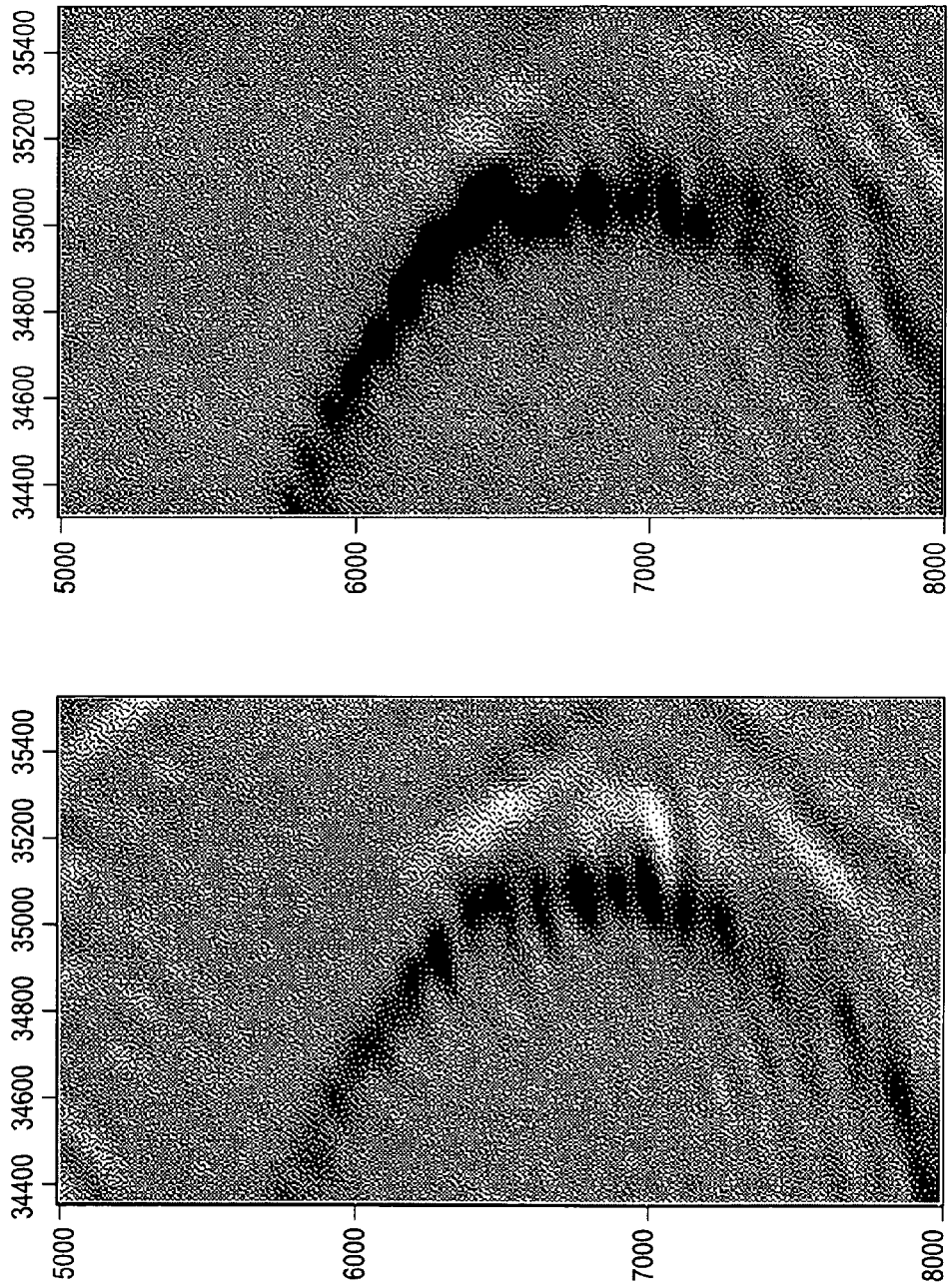
FIG. 10B (Prior Art) RTM
FIG. 10A tRTM tRTM

RTM

METHOD FOR TARGET-ORIENTED REVERSE TIME MIGRATION FOR PRESTACK DEPTH IMAGING

TECHNICAL FIELD

The present invention relates generally to geophysical prospecting using seismic data, and in particular to a method of migration of seismic data and inversion for subsurface property distributions.

BACKGROUND OF THE INVENTION

Rigorous solutions of wave equation are highly accurate in simulating wave propagation through complex subsurface regions. Downward continuation methods based on the one-way wave equation are well known for their computational efficiency and accuracy in handling multi-path events. Reverse-time migration (RTM) offers additional advantages over one-way imaging by removing the dip limitation and therefore is capable of handling wave propagation in any direction. Consequently a more complete set of waves (for example, prismatic waves, overturning waves and potentially multiples) can be used constructively for imaging challenging subsurface structures, such as steeply dipping or overhanging salt flanks. Although becoming increasingly affordable, RTM is generally considered more computationally intensive than one-way downward continuation methods.

The high computational cost of RTM arises from solving the two-way wavefield propagation. For example, the source wavefield is propagated over time and saved to an electronic storage medium. As a result, RTM requires a significant storage space for reverse-time access of 3D source wavefields unless wavefield storage is traded with increased computation time. In RTM, in addition to the forward wavefield propagation, the seismic data are back extrapolated and correlated with the source wavefield. The runtime cost of RTM is thus approximately twice that of forward full-wavefield modeling.

Several prior art methods have been proposed to make RTM more efficient for practical applications in recent years. One prior art method shows that RTM is equivalent to Generalized Diffraction Stack Migration (GDM). A reduced version of GDM, called wavefront wave-equation migration, uses only first-arrival information to back-propagate arrivals. By introducing a square-root operator, another prior art method shows that the two-way wave equation can be formulated as a first-order partial differential equation (PDE) for cost-effective implementation. Yet another prior art method suggests target-oriented reverse time datuming (RTD) by extrapolating wavefields to a subsalt artificial datum using a finite-difference solver. Below the datum, a less intensive imaging method such as Kirchhoff migration can be used. Most recently, another prior art method showed test examples of target-oriented RTD. There, however, still exists a need for methods which perform RTM in less-costly computational ways.

SUMMARY OF THE INVENTION

A method for target-oriented reverse time migration for prestack depth imaging and inversion is provided. The method includes acquiring prestack seismic data for a subsurface region, and determining an earth model for the subsurface region. The method further includes determining an acquisition area within the earth model and also determining a reference surface near a target within the earth model. The method also includes exciting wavefields from the reference surface and propagating the excited wavefields through the earth model. The method additionally includes recording the wavefields at receiver locations in the acquisition area and at the target, and synthesizing wavefields along the reference surface to reconstruct Green's functions or other equivalent transfer functions which relate the receiver locations in the acquisition area to the target. The method includes utilizing the Green's functions and prestack seismic data to determine subsurface characteristics of the subsurface region.

It can be appreciated by one skilled in the art that point sources or plane wave sources can be used to excite wavefields from the reference surface.

It can also be appreciated that the Green's functions can be utilized to construct images at the target which represent the subsurface at the target and the images can also be used in an inversion process to determine subsurface properties.

The present invention does not require intermediate data datuming and directly applies two-way scattered Green's functions for imaging target areas. The Green's functions relating the acquisition area and the imaging target are retained and separated from seismic data until applying the imaging condition. Such a separation of Green's functions and data provides analysis flexibility. The target-oriented approach allows for the ability to focus on critically important areas while attaining the capabilities of two-way imaging from RTM. The present invention is applicable to both 2D and 3D data sets and geometries.

It should also be appreciated by one skilled in the art that the present invention is intended to be used with a system which includes, in general, an electronic configuration including at least one processor, at least one memory device for storing program code or other data, a video monitor or other display device (i.e., a liquid crystal display) and at least one input device. The processor is preferably a microprocessor or microcontroller-based platform which is capable of displaying images and processing complex mathematical algorithms. The memory device can include random access memory (RAM) for storing event or other data generated or used during a particular process associated with the present invention. The memory device can also include read only memory (ROM) for storing the program code for the controls and processes of the present invention.

One embodiment of the present invention includes a system configured to perform target-oriented reverse time migration for prestack depth imaging. The system includes a data storage device having computer readable data including prestack seismic data and an earth model for a subsurface region, and a processor, configured and arranged to execute machine executable instructions stored in a processor accessible memory for performing a method. The method includes determining an acquisition area within the earth model and determining a reference surface near a target in the subsurface region of interest, and exciting wavefields from the reference surface and propagating the excited wavefields through the earth model. The method further includes recording the wavefields at receiver locations in the acquisition area and at the target, and synthesizing wavefields along the reference surface to reconstruct Green's functions which relate the receiver locations in the acquisition area to the target. The method includes utilizing the Green's functions and prestack seismic data to determine subsurface characteristics of the subsurface region.

Embodiments of the present invention can also be used to provide localized imaging update following model change and/or provide localized model building or updating by generating gathers at target locations. Embodiments of the present invention can also be utilized to interactively test uncertainties in structural imaging given errors in the velocity/anisotropy models. In yet other embodiments, the present invention can be used for localized waveform inversion.

BRIEF DESCRIPTION OF THE DRAWINGS

These and other objects, features and advantages of the present invention will become better understood with regard to the following description, pending claims and accompanying drawings where:

FIGS. 4A to 4D illustrate the images for one embodiment of the present invention and a prior art full-volume method for a single reflector.

FIGS. 5A to 5D illustrate the results of different sampling densities on the reference surface for one embodiment of the present invention.

FIGS. 7A and 7B illustrate the images for one embodiment of the present invention and a prior art method for a vertical reflector.

FIGS. 8A to 8D illustrate the results of different sampling densities on the reference surface for one embodiment of the present invention.

FIG. 9 illustrates the imaging target area based on a prior art full-volume method.

FIGS. 10A and 10B illustrate the images for one embodiment of the present invention and a prior art full-volume method for the target area involving an overhanging salt flank.

DETAILED DESCRIPTION OF THE INVENTION

The present invention improves the computational efficiency of RTM by focusing on target areas. Computational savings is achieved through limiting Green's functions related to target areas instead of over the entire volume of an earth model.

Figure 1:
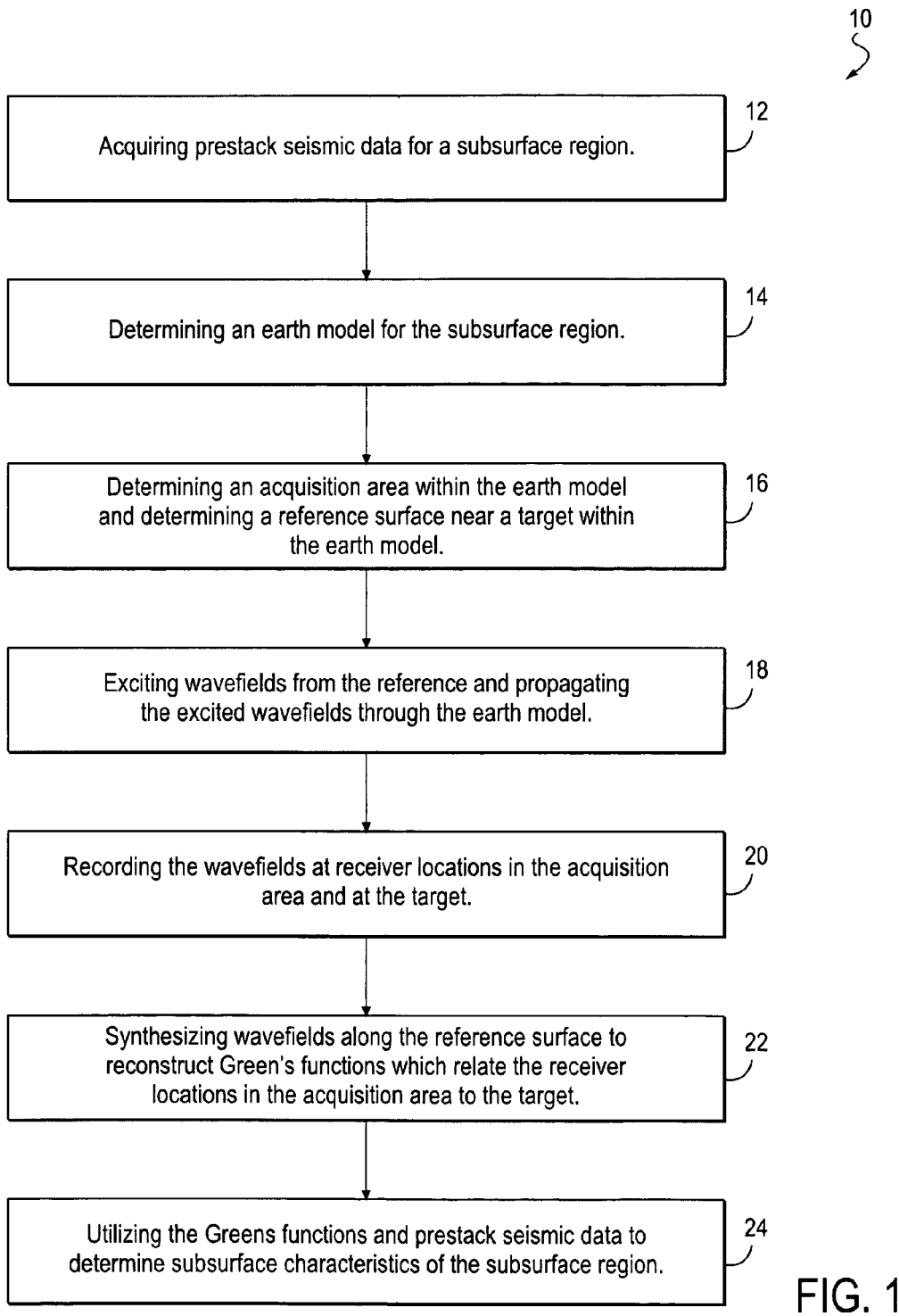
FIG. 1 illustrates a flowchart of one embodiment of the present invention.

FIG. 1 illustrates one embodiment of the present invention for a computer-implemented method for target-oriented reverse time migration for prestack depth imaging 10. The method includes acquiring prestack seismic data for a subsurface region 12 and determining an earth model for the subsurface region 14. The method further includes determining an acquisition area within the earth model and determining a reference surface near a target within the earth model 16, and exciting wavefields from the reference surface and propagating the excited wavefields through the earth model 18. The method also includes recording the wavefields at receiver locations in the acquisition area and at the target 20, and synthesizing wavefields along the reference surface to reconstruct Green's functions or other equivalent transfer functions which relate the receiver locations in the acquisition area to the target 22. The method includes utilizing the Green's functions to determine subsurface characteristics of the subsurface region 24.

In one prior art method, Schuster's formulation (2002) of migration in the frequency domain, the prestack depth imaging condition for a subsurface image point, x, can be described as follows:

$$I(x) = \sum_{w}\sum_{s}\sum_{r} G(x\mid s, w)^{*}\{G(x\mid r, w)^{*}D(s, r, w)\}$$

where I(x) is the image at subsurface point x; D(s,r,w) are shot gathers associated with source location s and receivers r; G(x|r,w) and G(x|s,w) represent the Green's functions from the receivers and the source, respectively, to the image point; and * denotes the complex conjugate. The conjugate of the Green's function multiplying seismic data in the frequency domain is equivalent to the cross correlation of the two terms in the time domain. The summation works in the order of receivers, shots and finally frequencies. The above imaging condition can be further compensated by wavefield illumination.

A key challenge in the above-described prior art formulation is to compute the Green's functions from receiver locations to image points both accurately and efficiently. To save computational cost, the present invention utilizes the Green's functions which are related only to image points within a target volume. However, it can be too costly to compute Green's functions G(x|r,w) directly, given the large number of image points even in a target zone.

One embodiment of the present invention breaks down the process into two steps. First, the Green's functions, G(d|r,w), are calculated from receiver locations to an artificial datum above the target zone. Second, the Green's functions, G(x|d, w), are calculated from the datum down to the image points. By summing over the datum through stationary phase approximation, the Green's functions, G(x|r,w), can be reconstructed from its two breakdown components, G(d|r,w) and G(x|d,w), as follows:

$$G(x\mid r, w) \approx \sum_{datum} G(d\mid r, w)G(x\mid d, w)$$

In certain embodiments of the present invention, the Green's functions are computed by using a two-way finite-difference solver. It should be appreciated by one skilled in the art that other forms of modeling can also be used depending on the complexity of medium properties. The summation over the area of datum ensures that only stationary-phase contributions stand out. To meet the criterion of stationary phase approximation, the spatial sampling over the artificial datum needs to be fine enough, and the aperture coverage needs to be wide enough over the target. It will be appreciated by one skilled in the art that the artificial datum or reference surface around the target area can be of different shapes and is not limited to a flat surface.

Figure 2:
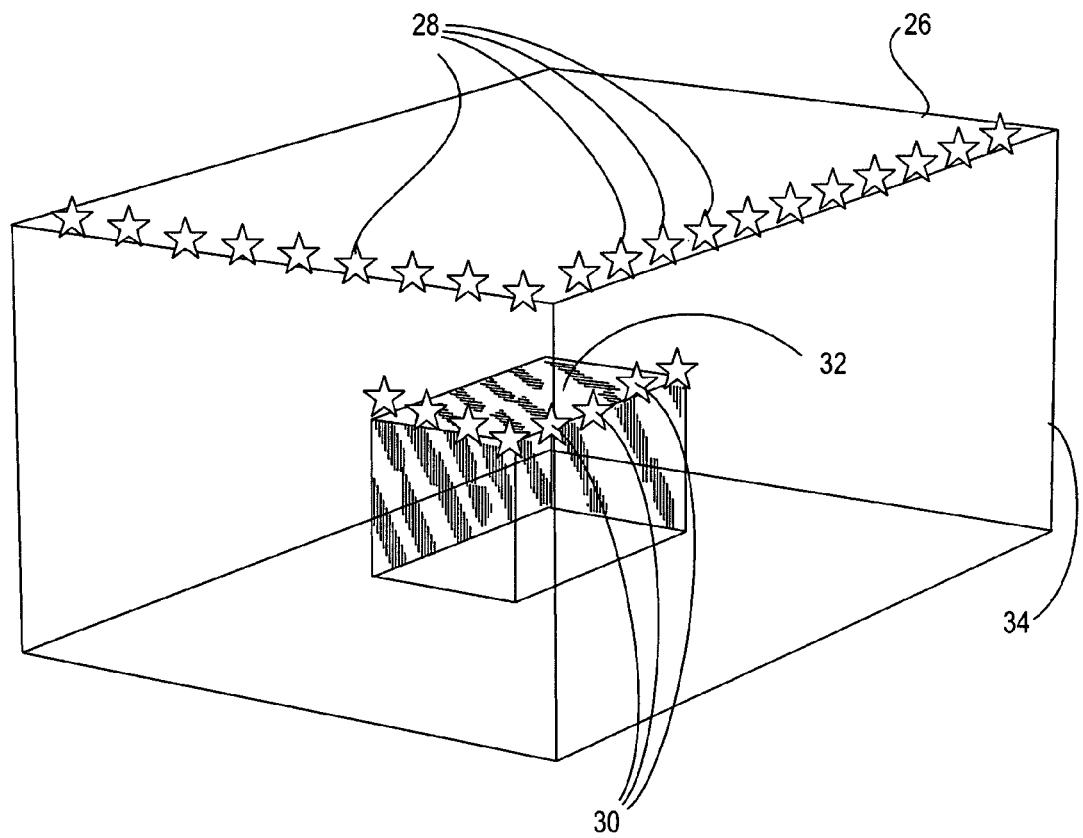
FIG. 2 illustrates one embodiment of the present invention wherein the reference surface is shown in reference to an example of surface used in a prior art full-volume method.

The gain in computational efficiency in the target-oriented approach of the present invention is two-fold. First, the number of samples over an artificial datum is significantly fewer than that of shot gathers over the surface. FIG. 2 illustrates this computational savings for one embodiment of the present invention where point sources have been used. For prior art methods where the full volume 34 RTM is being determined the number of point sources 28 utilized in RTM is significantly higher than the point sources 30 utilized by the present invention. The present invention utilizes a datum or reference surface 32 that is smaller than the surface 26 for traditional RTM, thus, the present invention is able to use less point sources 30 than prior art RTM. In general, the datum for splitting Green's functions is selected close to a spatially limited target zone. In addition, interpolation of coarse samples over the datum may provide further savings. Second, the decomposed Green's functions over and under the datum can be computed simultaneously. On the contrary, wave propagation in traditional RTM is computed twice: the first for the source wavefield and the second for the receiver wavefield.

Figure 3:
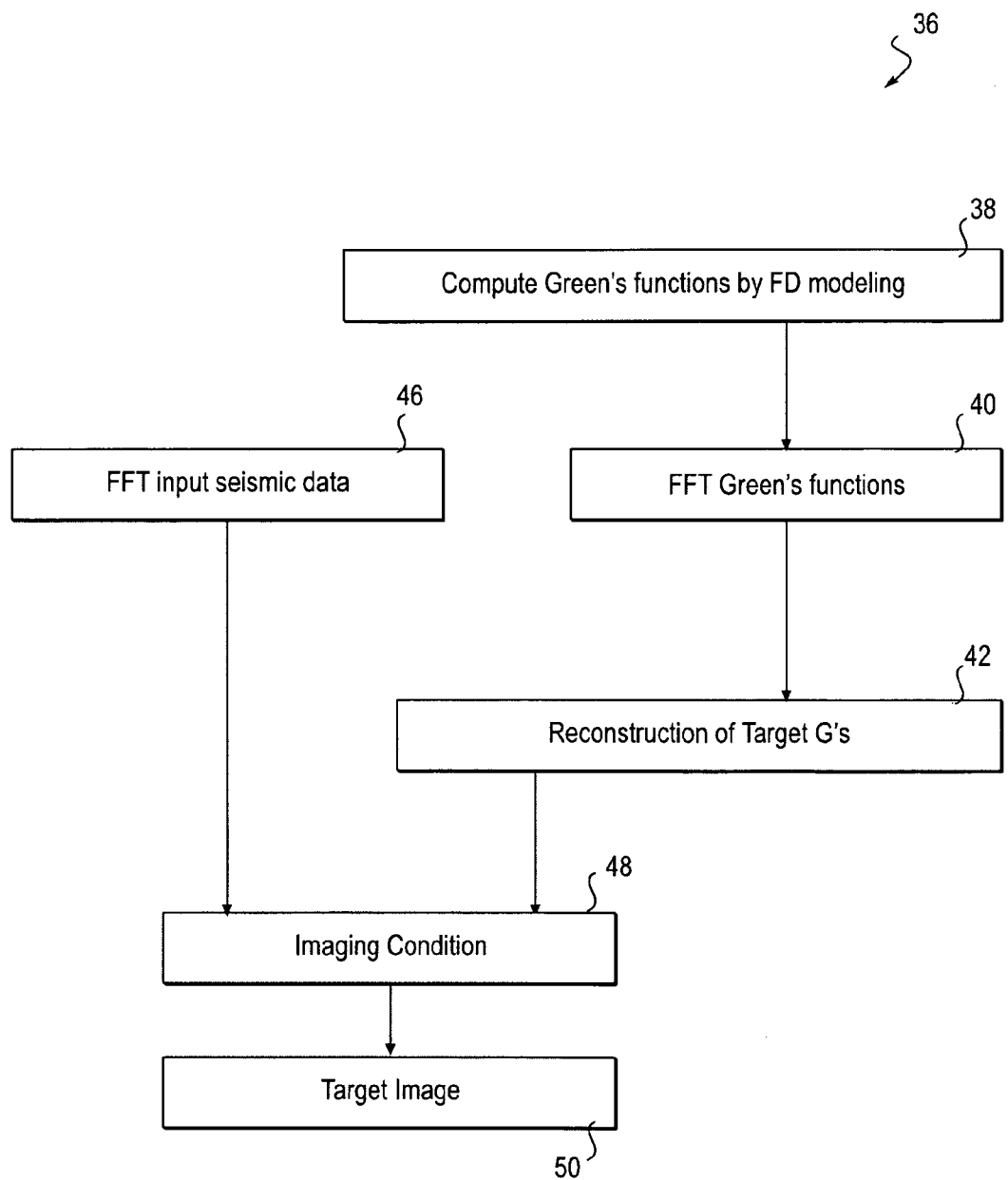
FIG. 3 illustrates a flowchart of one embodiment of the present invention.

FIG. 3 shows a method 36 of one embodiment of the present invention for the target-oriented reverse-time migration. As can be appreciated, this particular embodiment can be readily implemented parallel in frequency on Linux clusters. The Green's functions are computed by Finite Difference (FD) modeling 38. The method then performs a Fast Fourier Transform (FFT) on the computed Green's functions 40. The acquisition surface to target Green's functions are reconstructed 42. In this embodiment, in concurrence with this step 42, a FFT is performed on the input seismic data 46 and is used as inputs along with the reconstructed Green's functions 42 to provide imaging conditions 48. The method then constructs images of the target zone 50 which can be used to determine the subsurface characteristics of the subsurface region.

FIGS. 4A to 4D illustrate one embodiment of the present invention, where a strong velocity contrast 52 lies at 3 km in depth. FIG. 4A is a velocity model of the subsurface region of interest utilized for this embodiment. FIG. 4B is the single shot gather with the source at the center. FIG. 4C is the target-oriented RTM imaging results, and FIG. 4D is the prior art full-volume RTM imaging results for comparison. In this embodiment both images are from a single shot gather. An artificial datum or reference surface 54 for reconstructing the target Green's function is 1 km above the target area 56. The reference surface 54 is sampled at a 50 m spacing to generate Green's functions by a finite-difference solver. By applying target-oriented imaging condition to a single shot gather, the velocity contrast 52 is imaged as a flat event 60 at the correct position.

Proper sampling over the reference surface is important to hold the stationary phase approximation valid. FIGS. 5A to 5D illustrate that with increasing sampling density over the reference surface, the reconstructed Green's function approaches the correct answer. FIG. 5A is again a velocity model for the subsurface of interest. FIG. 5B is the imaging results of this embodiment with the reference surface or artificial datum sampled at 500 m apart. FIG. 5C is the imaging results of this embodiment with the reference surface sampled at 50 m apart. FIG. 5D is the prior art full-volume RTM image for comparison with the imaging results of the present invention. In this embodiment, there are ghost events 62 due to the presence of the reference surface and two-way wave propagation. However, the ghost events 62 are usually out of phase and do not contribute to final images. Some edge effects 64 are also visible in FIG. 5C. They can be tapered to minimize adverse effects on images.

Figure 6:
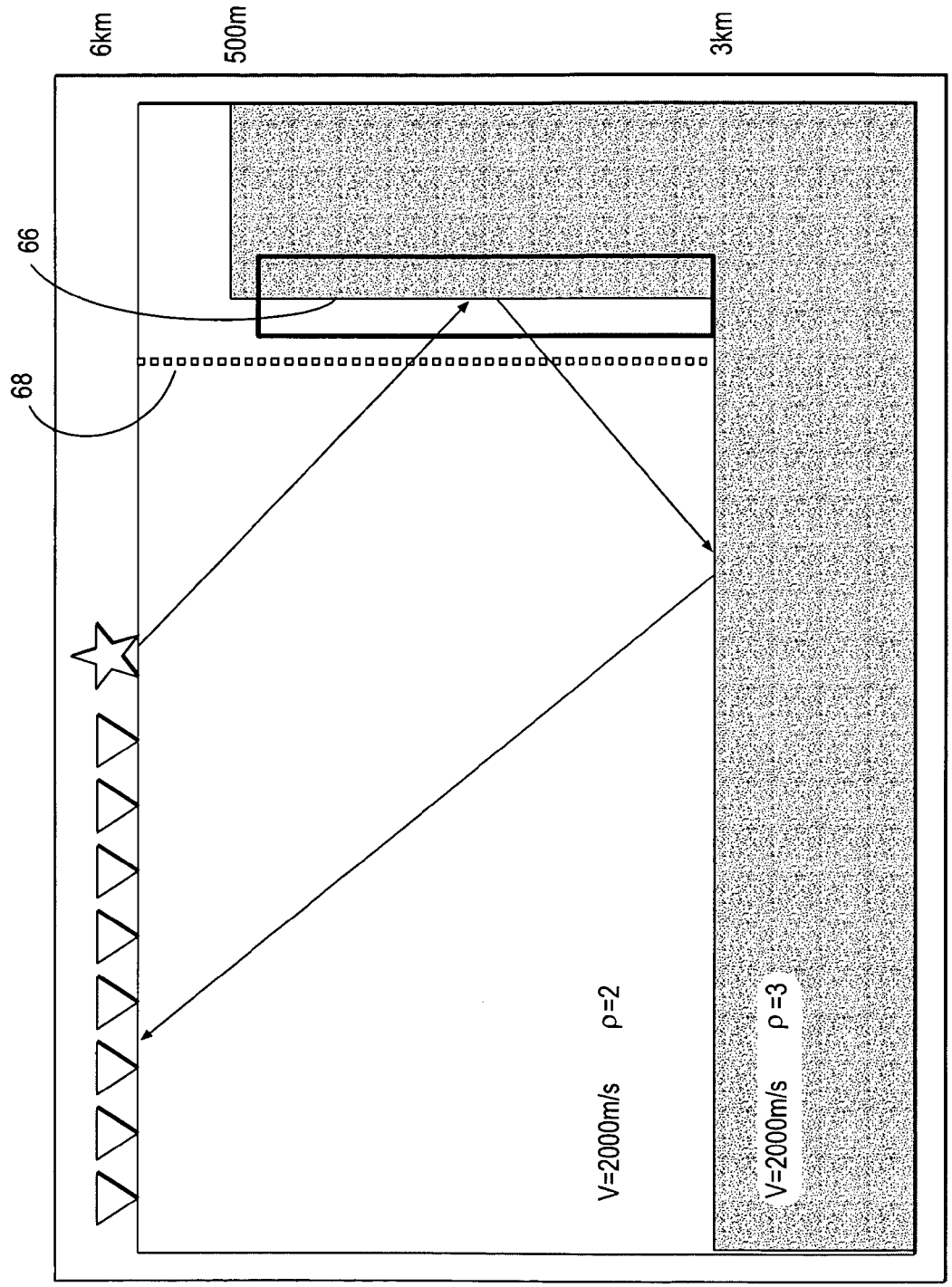
FIG. 6 illustrates the acquisition geometry for one embodiment of the present invention and a prior art method for a vertical reflector.

FIGS. 6, 7A and 7B illustrate another embodiment of the present invention where the imaging target is a vertical reflector 66. FIG. 6 illustrates a velocity model for the subsurface region of interest and shows the reference surface 68. FIG. 7A illustrates an image obtained with this embodiment of the present invention for the target-oriented imaging. FIG. 7B illustrates an image utilizing the prior art method of full-volume of RTM. The velocity throughout the whole region is a constant at 2000 m/s. One skilled in the art would appreciate that such a velocity distribution would make it impossible to image the vertical reflector using one-way imaging. As shown in FIG. 7A, the vertical reflector 70 is well focused and correctly positioned. This indicates that target-oriented imaging of the present invention is capable of utilizing multi-bouncing events (or prism waves) for imaging subsurface regions.

FIGS. 8A to 8D illustrate the results of different sampling densities on the reference surface for one embodiment of the present invention. In this example, the sampling rate varies from 10 m to 80 m. Sampling rate close to the dominant wavelength (40 m) still retains accurate imaging with minimal artifacts.

Figure 11B:
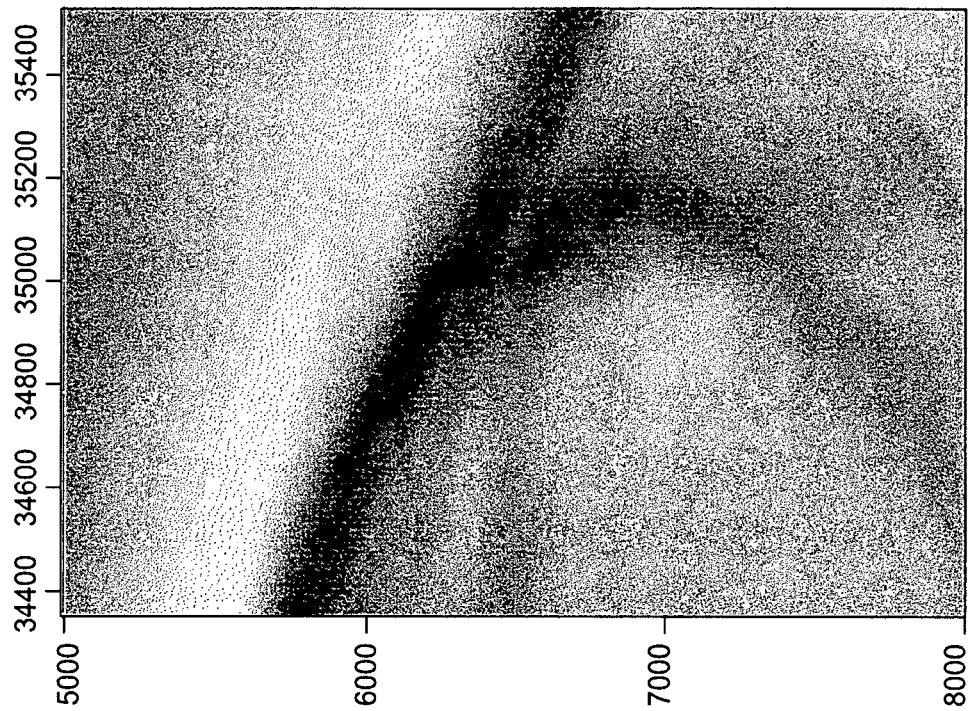
FIGS. 11A and 11B illustrate the illumination intensity for one embodiment of the present invention and a prior art full-volume method for the target area.
Figure 11A:
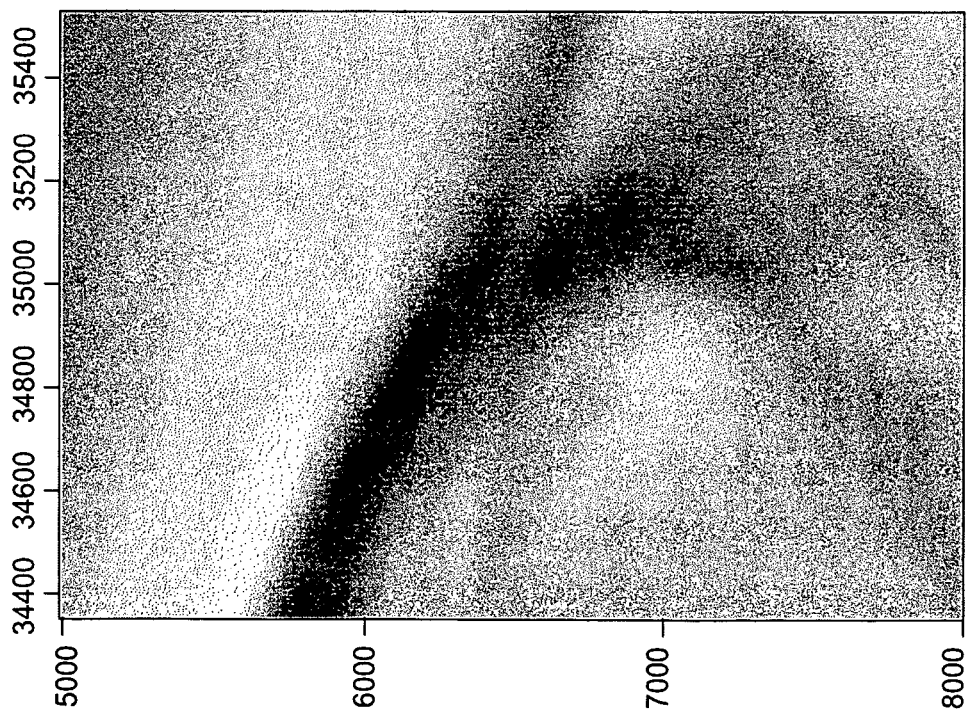

Another embodiment of the present invention is illustrated in FIGS. 9, 10A and 10B. FIG. 9 illustrates a target imaging area highlighted by a box 72 for the subsurface region of interest. The reference surface 74 is set at 1 km left of the target 72 and sampled at a 80 m spacing to generate Green's functions left and right of the datum 74. FIG. 10A illustrates the target-oriented RTM image of the present invention, and for comparison FIG. 10B illustrates the prior art full-volume RTM imaging. The images in these figures are based on a single shot gather. As shown in FIG. 10A, the overhanging salt flank is recovered by target-oriented RTM. FIGS. 11A and 11B compare the illumination intensity over the imaging region of interest. The illumination intensity is an autocorrelation of the reconstructed Green's functions which relate the acquisition surface to the target.

Figure 12A:
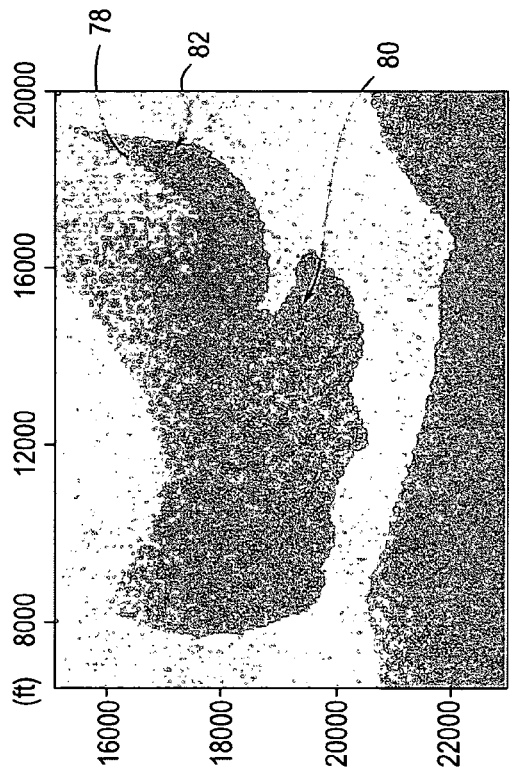
FIGS. 12A to 12D illustrate the velocity model and images for one embodiment of the present invention and a prior art full-volume method for a deepwater complex structure FIG. 13 schematically illustrates an example of a system for performing the present invention.
Figure 12B:
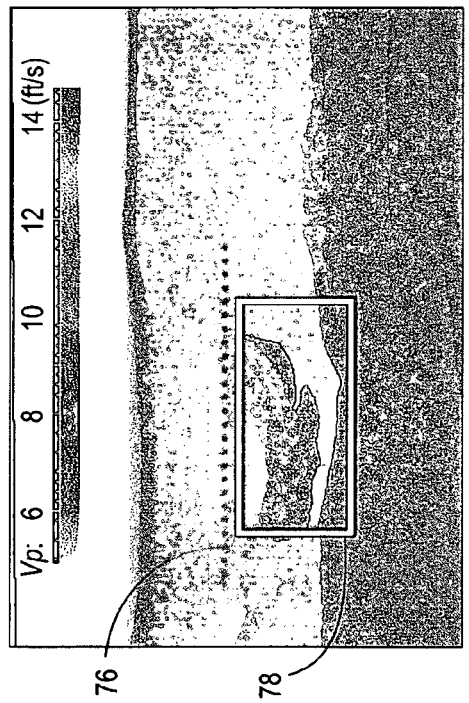
Figure 12C:
Figure 12D:
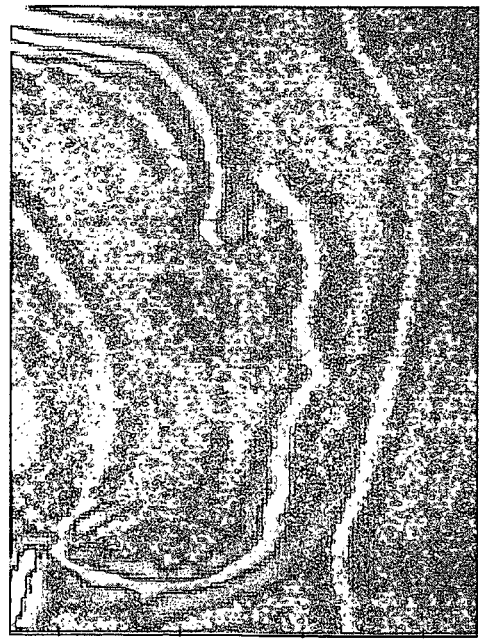

It should be appreciated that the present invention can also utilize multiple shot gathers. FIGS. 12A to 12D illustrate an embodiment utilizing multiple shot gathers for a deepwater complex structure. FIG. 12A illustrates a velocity model for the subsurface region of interest. The dashed line indicates the reference surface 76 for the target imaging 78 of the present invention. FIG. 12B is an enhanced view of the target 78 in the velocity model. FIG. 12C illustrates the target-oriented RTM image of the present invention, and for comparison FIG. 12D illustrates the prior art full-volume RTM imaging. The number of shots utilized with the reference surface for this embodiment is 188 with a 160 foot spacing. The seismic data utilized in this embodiment consists of 435 shot gathers recorded on surface. The reference surface is selected above a rugose part of top-of-salt 80 and intersects a steeply dipping salt flank 82. The target-oriented images of the present invention and the full-volume images are comparable in structural delineation of the complex deepwater structure including the steeply dipping and overhanging salt flanks.

It will be appreciated by one skilled in the art that the present invention can be applied to 3D.

Figure 13:
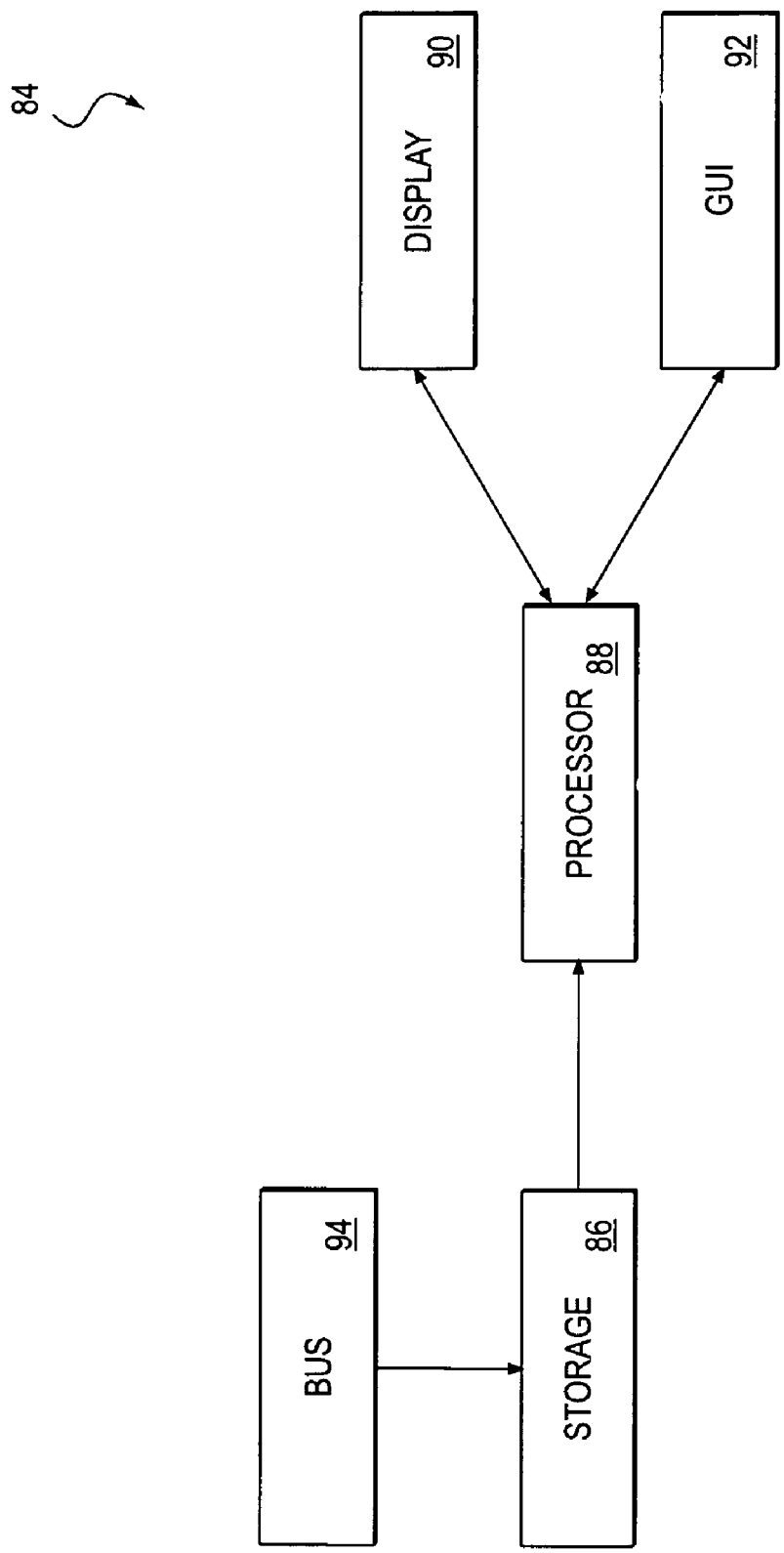

An example of a system for performing the present invention is schematically illustrated in FIG. 13. A system 84 includes a data storage device or memory 86. The stored data may be made available to a processor 88, such as a programmable general purpose computer. The processor 88 may include interface components such as a display 90 and a graphical user interface (GUI) 92. The GUI 92 may be used both to display data and processed data products and to allow the user to select among options for implementing aspects of the method. Data may be transferred to the system 84 via a bus 94 either directly from a data acquisition device, or from an intermediate storage or processing facility (not shown).

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A computer-implemented method for target-oriented reverse time migration for prestack depth imaging, the method including:
   acquiring prestack seismic data for a subsurface region;
   determining, via a computer, an earth model for the subsurface region;
   determining, via a computer, an acquisition area within the earth model;
   determining, via a computer, a reference surface near a target within the earth model;
   exciting, via a computer, wavefields from the reference surface;
   propagating, via a computer, the excited wavefields through the earth model;
   recording, via a computer, the wavefields at receiver locations in the acquisition area and at the target;
   synthesizing, via a computer, wavefields along the reference surface to reconstruct Green's functions which relate the receiver locations in the acquisition area to the target; and
   utilizing, via a computer, the Green's functions and prestack seismic data to determine subsurface characteristics of the subsurface region.

2. The method of claim 1 wherein either point sources or plane waves is utilized to excite wavefields from the reference surface.

3. The method of claim 1 wherein the subsurface characteristics of the subsurface region is utilized to construct images at the target which represent the subsurface region at the target.

4. The method of claim 1 wherein the subsurface characteristics of the subsurface region is utilized in an inversion to determine subsurface properties of the subsurface region at the target.

5. The method of claim 1 wherein the prestack seismic data is either 2D or 3D.

6. A system configured to perform target-oriented reverse time migration for prestack depth imaging, the system comprising:
   a data storage device having computer readable data including prestack seismic data and an earth model for a subsurface region;
   a processor, configured and arranged to execute machine executable instructions stored in a processor accessible memory for performing a method comprising:
      determining an acquisition area within the earth model;
      determining a reference surface near a target in the subsurface region of interest;
      exciting wavefields from the reference surface;
      propagating the excited wavefields through the earth model;
      recording the wavefields at receiver locations in the acquisition area and at the target;
      synthesizing wavefields along the reference surface to reconstruct Green's functions which relate the receiver locations in the acquisition area to the target; and
      utilizing the Green's functions and the prestack seismic data to determine subsurface characteristics of the subsurface region.

7. A system as in claim 6, further comprising a display, configured and arranged to display at least one image which represents the subsurface region at the target, where in the image was constructed utilizing the subsurface characteristics of the subsurface region.

8. The system of claim 6 wherein either point sources or plane waves is utilized to excite wavefields from the reference surface.

9. The system of claim 6 wherein the subsurface characteristics of the subsurface region can used in inversion to determine subsurface properties of the subsurface region at the target.

10. The system of claim 6 wherein the prestack seismic data is either 2D or 3D.

* * * * *